July 31, 1934. H. H. COUCH 1,968,029
AUTOMATIC CONTROL FOR CONTROLLABLE PITCH PROPELLERS
Filed June 19, 1933 5 Sheets-Sheet 1

INVENTOR
HOWARD H. COUCH
BY Francis F. Vanderwerker
Wade Koontz
ATTORNEYS

July 31, 1934.  H. H. COUCH  1,968,029
AUTOMATIC CONTROL FOR CONTROLLABLE PITCH PROPELLERS
Filed June 19, 1933   5 Sheets-Sheet 2
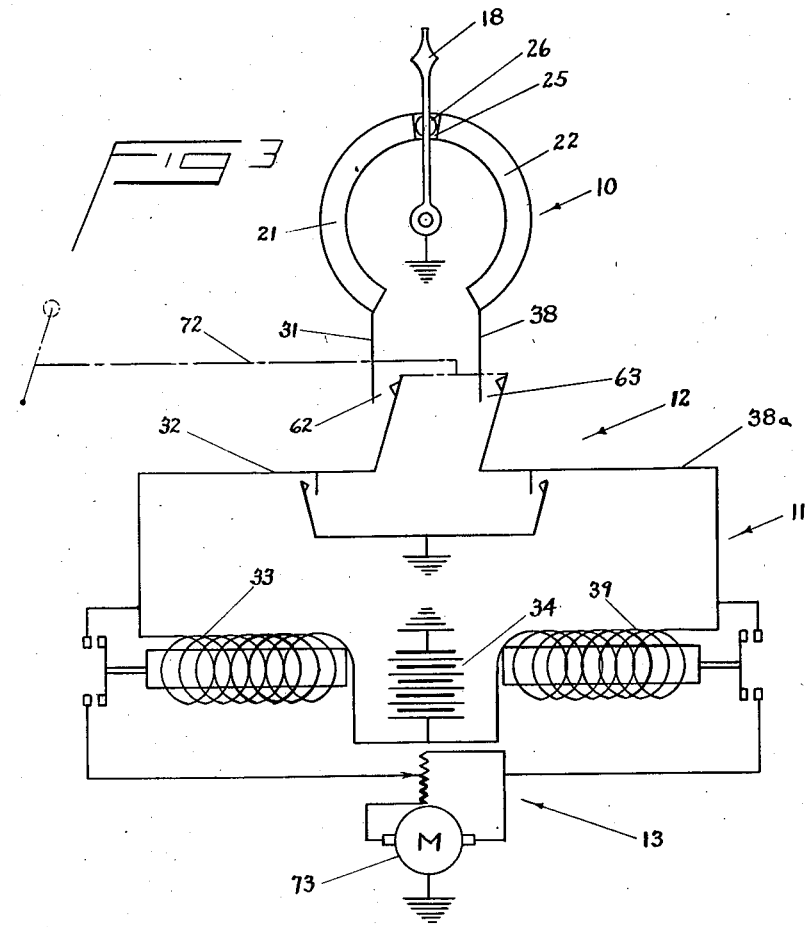
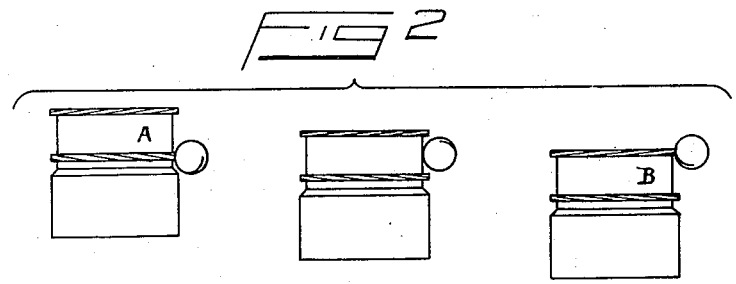
INVENTOR
HOWARD H. COUCH
ATTORNEYS July 31, 1934.                H. H. COUCH                1,968,029
           AUTOMATIC CONTROL FOR CONTROLLABLE PITCH PROPELLERS
                     Filed June 19, 1933      5 Sheets-Sheet 3
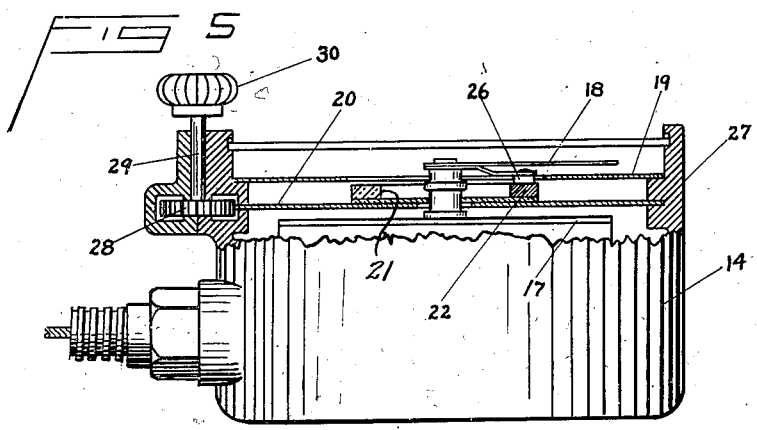
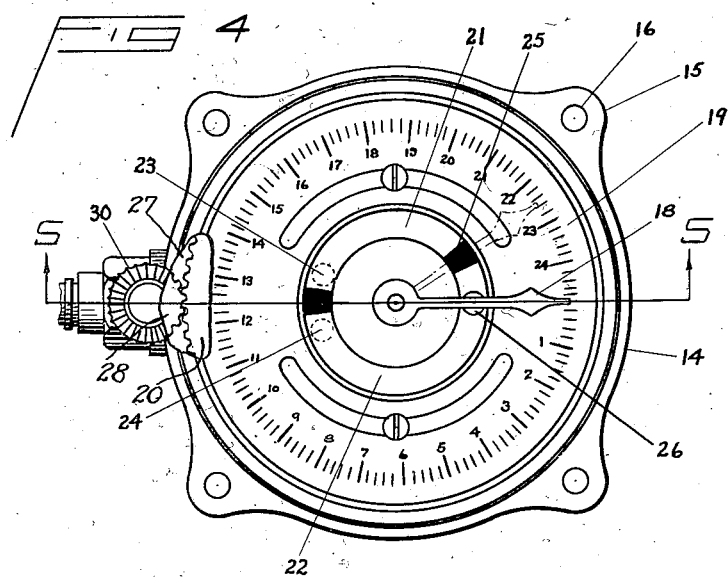
INVENTOR
HOWARD H. COUCH
ATTORNEYS July 31, 1934.  H. H. COUCH  1,968,029
AUTOMATIC CONTROL FOR CONTROLLABLE PITCH PROPELLERS
Filed June 19, 1933  5 Sheets-Sheet 4
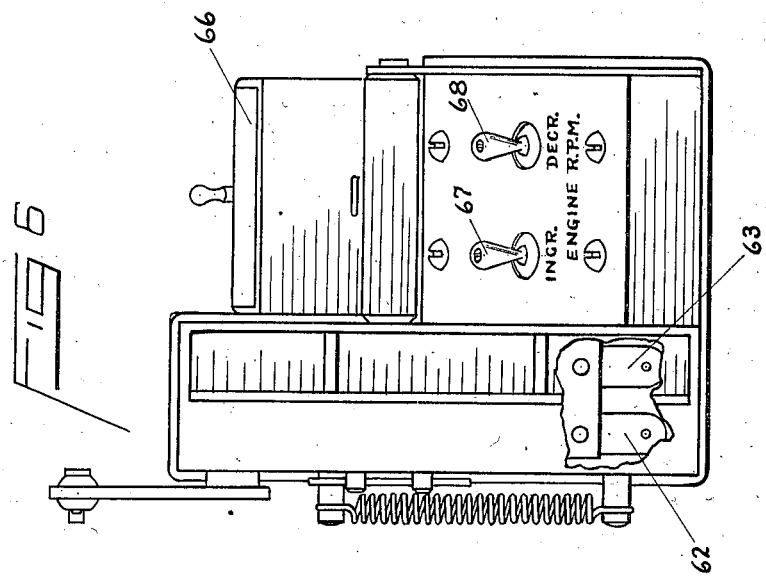
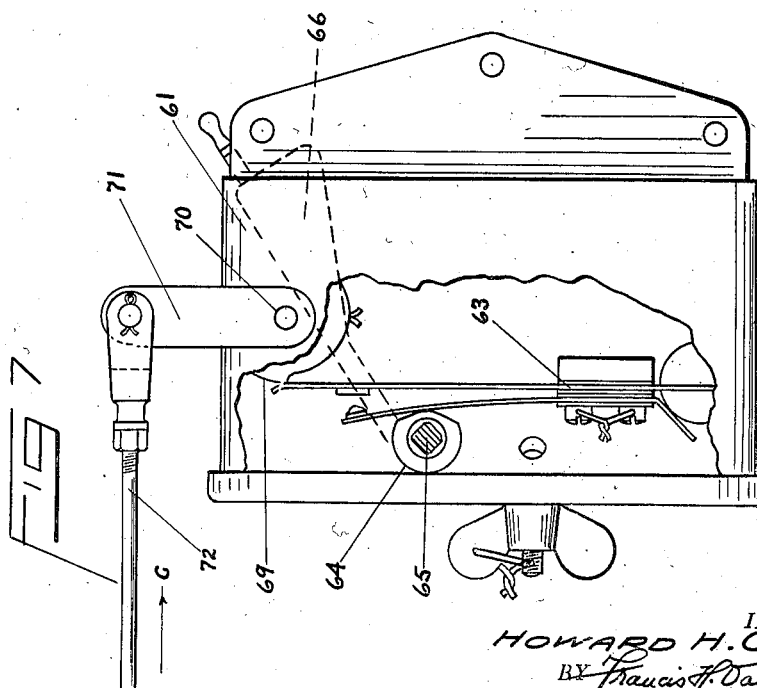
INVENTOR
HOWARD H. COUCH
ATTORNEYS

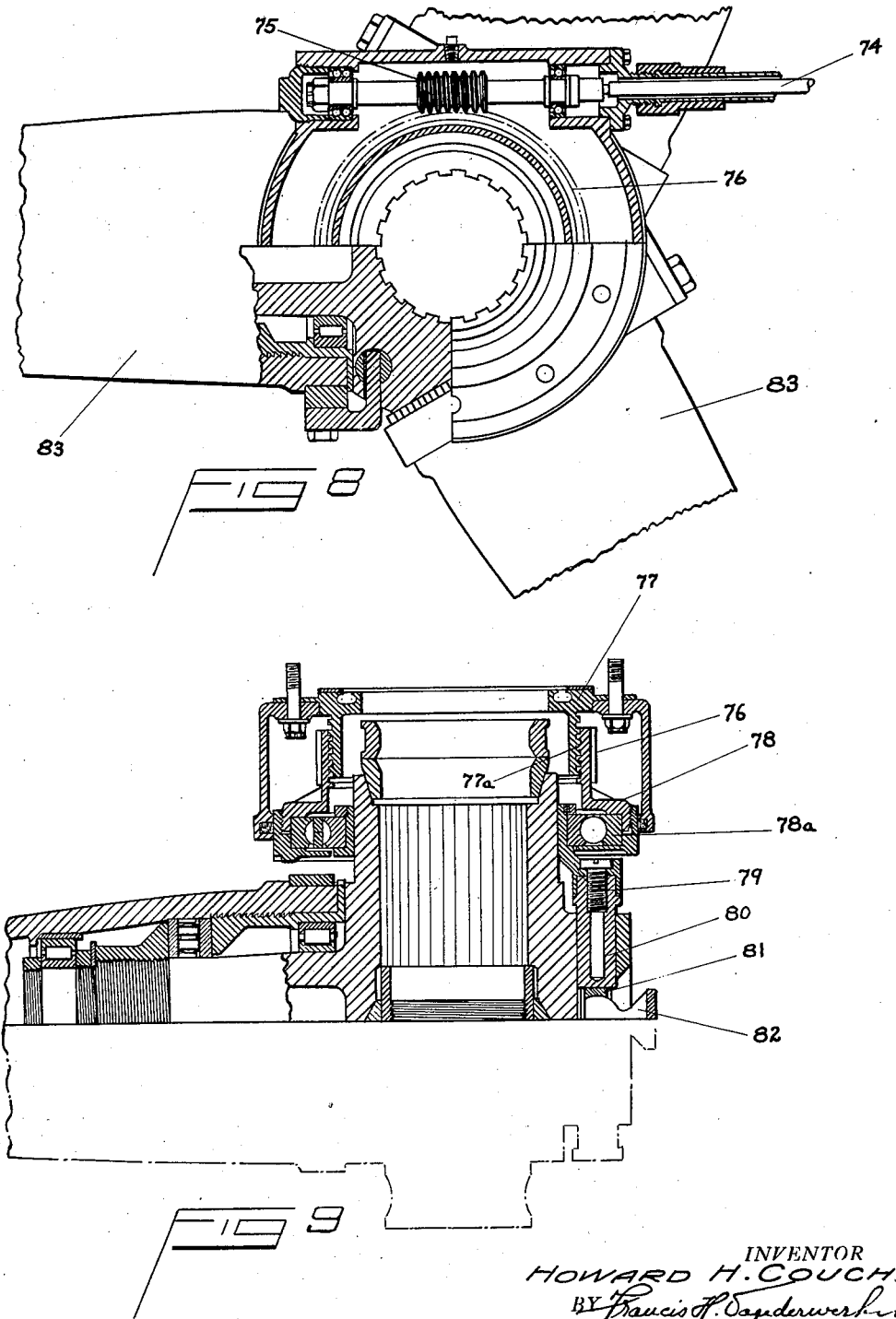

Patented July 31, 1934

1,968,029

UNITED STATES PATENT OFFICE 1,968,029

AUTOMATIC CONTROL FOR CONTROLLABLE PITCH PROPELLERS

Howard H. Couch, Dayton, Ohio

Application June 19, 1933, Serial No. 676,562

42 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to propellers and more particularly to improved means for producing a variable pitch in propeller blades.

The improvements contemplated in the present invention are especially of importance in aeronautics in that maximum performance or efficiency is derived from the power plant of an aircraft under varying flight conditions. The means of propulsion of an aircraft, namely, engine and propeller, are calculated for a normal density of air, i. e., (1 atm.) at which the highest efficiency is obtained. In ascending, the density of the air decreases and consequently, the engine and propeller under ordinary circumstances decrease in efficiency and as a result the aircraft speed is reduced.

In overcoming these disadvantages, supercharged engines have been developed on the one hand, in order that the efficiency of the engine could be maintained substantially constant. On the other hand, propellers with variable pitch have been employed in which the pitch of the blades is capable of adjustment in accordance with variations of air density and variations in engine speeds. Under these circumstances, both the engine and propeller require the constant observation of the pilot, who, with the greatest amount of attention, will not find it possible to effect the control necessary with such regularity that in the constantly varying air density, a constant efficiency of the engine can be maintained and a corresponding increase or decrease in pitch given the propeller. The foregoing applies generally to conditions encountered in flight when ascending or descending in gradual steps.

In the case of military aircraft, where quick maneuvering of the aircraft is desired, especially while in combat, and during which time the aircraft may be subjected to diving or climbing attitude in rapid succession, it becomes physically impossible on the part of the pilot to obtain maximum performance from the engine. This may be more readily understood if we assume that the throttle has been adjusted to give an indication of 2000 R. P. M. at level flight, and with the pitch of the propellers set to a point to give maximum performance. Under these circumstances, if the pilot suddenly dives the aircraft, the speed of the engine would be suddenly increased and it would become necessary under these circumstances to increase the pitch of the propeller to thereby increase the load on the engine and consequently decrease the speed of the engine. On the other hand, if the pilot suddenly maneuvers the airplane into a climbing attitude and with the throttle set at 2000 R. P. M. the load imposed on the engine will be increased and it becomes necessary to decrease the pitch of the propeller blades and consequently decrease the load on the engine and bring its speed up to the desired R. P. M.

The primary object, therefore, of the present invention is to relieve the pilot of an aircraft of all effort in adjusting the blade angle on a controllable pitch propeller and at the same time allow the engine to be governed to any desired R. P. M. with various throttle settings.

A further object of the present invention is to provide in connection with the engine and propeller, means whereby a change in the pitch of the blades of the propeller may be accomplished automatically in response to a change in the engine speed.

A still further object of the present invention is to provide in conjunction with said automatic means, further means whereby the pitch of the blades of the propeller may be further varied by the operation of the pilot. In this connection, I have provided a means whereby the control may performed entirely by the pilot.

A still further object of the present invention is to provide electrical means whereby the pitch of the blades of the propeller may be controlled both automatically and manually and including a throttle operated device which disconnects the automatic means from the circuit during idling speed of the engine.

A still further object of the present invention is to provide in connection with an engine and controllable pitch propeller, an electric control system so constructed and arranged such that automatic and manual control cannot be operated at the same time.

Still other objects and advantages of my invention will become apparent in the following detailed description thereof.

In the drawings:

Fig. 2 is a diagrammatic view illustrating the various positions assumed by the collar of the mechanically operated propeller shifting mechanism when actuated by the solenoids shown in Fig. 1.

Fig. 3 is a diagrammatic view of the governing device and electric control system as applied to a propeller shifting mechanism controlled by an electric motor.

Fig. 4 is a plan view of the governing device per se.

Fig. 5 is a cross sectional view taken on the line 5—5 of Fig. 4.

Fig. 6 is a front elevation partly broken away of the automatic switching device used in the electrical control system.

Fig. 7 is an end view of Fig. 6 with the parts broken away.

Fig. 8 is a sectional view of the motor controlled propeller blade shifting mechanism illustrated in diagrammatic form in Fig. 3.

Fig. 9 is a further sectional view of the propeller blade shifting mechanism illustrated in Fig. 8.

Figure 1:
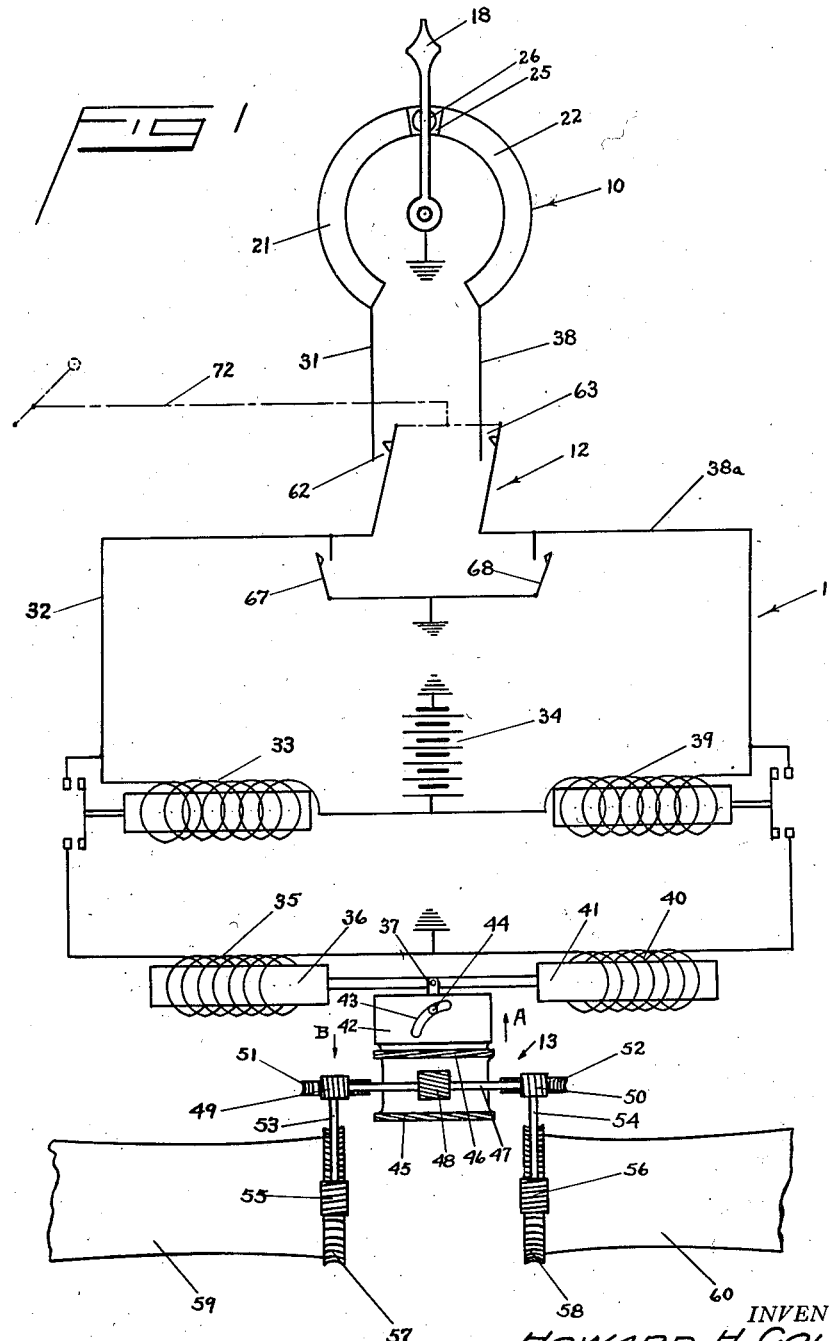
Fig. 1 is a diagrammatic view illustrating the governing device and electric control system as applied to a mechanically actuated propeller pitch changing mechanism.

Referring more particularly to the drawings wherein corresponding parts are designated by like numerals throughout the several views thereof, the apparatus in one embodiment of my invention herein illustrated comprises generally several separate units hereinafter designated as the pitch governing device 10, the electric control system 11, the switching device 12, and the propeller pitch changing mechanism 13. For the purpose of making clear the operation of this invention, the several units hereinabove referred to will be described in detail separately.

The governing device 10 is essentially a chronometric type tachometer which is driven from the crankshaft of an internal combustion engine and comprises generally a casing 14 provided with the ears 15 having openings 16 therein to permit of the casing being mounted upon the instrument board of an aircraft. The numeral 17 generally indicates the driving mechanism of the tachometer which effects a movement of the pointer or index arm 18 over its scale 19 in order to indicate the R. P. M. of the engine. By observing Fig. 4, it will be noted that the casing 14 has rotatably mounted therein a plate indicated by the numeral 20 which has arranged thereon and insulated therefrom a pair of concentrically arranged segmental contact strips indicated by the numerals 21 and 22. As shown in Fig. 4, the one end of each contact strip may have attached thereto binding posts shown in dotted lines and generally indicated by the numerals 23 and 24. The junction of the other end of these contact strips is separated by means of a dead spot of insulation material indicated by the numeral 25. It should also be noted, by referring to Figs. 4 and 5, that the index arm 18 has secured thereto an electrical contactor indicated by the numeral 26 adapted for alternatively making contact with the contact strips 21 and 22. As will be noted by referring to Figs. 4 and 5, the peripheral edge of the plate 20 is formed with gear teeth 27 with which meshes a pinion 28 carried on a rotatable shaft 29 mounted in the casing 14. The outer end of this shaft has attached thereto a hand knob indicated by the numeral 30.

The operation of the governing device is as follows:

The hand knob 30 is rotated until the dead spot 25 and junction of the contact strips 21 and 22 points to the desired R. P. M. on the tachometer scale. It should be noted that the dead spot or segment of dead area between the contact strips 21 and 22 is sufficiently wide in order that slight fluctuation in the R. P. M. of the engine will not permit the contactor 26 from engaging or contacting with either the contact strip 21 or 22. It is to be understood that the segment of dead area indicated by the numeral 25 may be varied to provide any desired limit to the R. P. M. variation before the controls become effective in changing blade angles.

Fig. 1 illustrates in diagrammatic form the governing device and electric control system adapted for use in connection with a mechanically driven propeller pitch changing mechanism. By referring to this figure, it will be noted that the contact strip 21 is electrically connected to the switching device 12 by the wire 31 and through the wire 32 with the one side of an electric relay 33. This relay, as will be noted, is electrically connected with a source of electrical energy such, for example, as the one terminal of a battery 34. The other terminal of the battery 34 is suitably grounded as is the one side of the switching device 12 heretofore mentioned. The relay 32 is also connected in series with an electromechanical device such as the winding of a solenoid 35 which in turn is suitably grounded as shown in this figure. The plunger 36 of the solenoid 35 is mechanically connected to the shifting lever 37 of the mechanically driven propeller pitch changing mechanism.

In a like manner the contact strip 22 of the governing device is electrically connected to the switching device 12 by the wire 38 and with a second electric relay 39 by means of the wire 38a which, in turn, is electrically connected to the battery 34 heretofore mentioned. The relay 39 is electrically connected to the winding of a second electro-mechanical device such as the solenoid 40 which in turn is suitably grounded. The plunger 41 of the solenoid 40 is also connected to the shifting lever 37 of the pitch changing mechanism. As will be noted by referring to Fig. 1, the solenoids 35 and 40 are positioned in opposing relation with one another. It is to be understood that the contactor 26 is suitably grounded to the casing of the governing device.

One form of a mechanically driven propeller pitch changing mechanism is illustrated in Fig. 1. This pitch changing mechanism may be of any conventional form but for the purpose of illustrating my invention, I have shown the same as including a collar 42 to which the shifting lever 37 is fixedly attached. The collar 42 is provided with a spiral groove 43 within which is adapted to operate a stationary pin 44. The collar 42 is also provided with an extension formed on its opposite ends with the worms 45 and 46 respectively. The collar 42 is mounted to rotate with the crankshaft of the engine. A cross shaft 47 is provided upon which centrally is mounted a worm gear 48. The outer ends of the shaft 47 have mounted thereon the worm gears 49 and 50 which are in meshing engagement with the worms 51 and 52 respectively. The worms 51 and 52 are carried by the rotating shafts 53 and 54 respectively, upon the outer end of which the worms 55 and 56 are mounted. These last mentioned worm gears are in meshing relation with the worms 57 and 58 formed on the inner end of the propeller blades 59 and 60 respectively.

The switching device 12 heretofore mentioned, comprises generally a casing 61 within which is mounted a pair of spring switches indicated by the numerals 62 and 63 respectively, and which, as shown in Fig. 1, interconnect, when closed, the wires 31 and 32 and the wires 38 and 38a respectively. The opening and closing of these switches is controlled through the medium of a cam 64 mounted upon a shaft 65, the outer end of which as shown in Fig. 6, has attached thereto a manually controlled handle generally indicated by the numeral 66. The switching device 12, as will be noted by referring to Fig. 6 is also provided with a pair of momentary contact switches indicated by the numerals 67 and 68. These switches are adapted for electrical connection in the electric control system in the manner shown in Fig. 1, the purpose of which will be hereinafter more fully set forth. By observing Fig. 7, it should also be noted that the casing 61 has mounted therein a master cam indicated by the numeral 69 which is rotatably mounted upon the shaft 70. The shaft 70 has connected thereto at its outer end a lever 71 which is adapted to be connected to the throttle of the aircraft engine (not shown) through the medium of the link 72.

The operation of the system thus far described is as follows:

Assume that the R. P. M. of the engine is 2250 as shown by the index arm in the dotted line position in Fig. 4. Under these circumstances the adjusting knob 30 is turned until the dead spot 25 at the junction of the contact strips 21 and 22 points to the indicated R. P. M. on the tachometer scale. With the switches 62 and 63 closed as would be the case were the handle 66 moved to the down position, the operation would be as follows:

Should the engine speed up to an R. P. M. higher than the R. P. M. at which the device is set to regulate, contact will be established between the contactor 26 and the contact strip 22; in so doing the circuit through the relay 39 closes and its contact points which are in series with the solenoid 40 are closed and permit the current to flow through the solenoid, consequently, pulling the plunger 41 into the solenoid coil and engaging the propeller blade shifting mechanism. Under these circumstances the angle of the propeller blade is increased until the engine is loaded to such an extent that the R. P. M. is brought down to the desired speed, which is the speed toward which the dead spot 25 is pointed. The foregoing, is of course effected through the shifting of the collar 42 of the propeller shifting mechanism, that is, when the plunger 41 of the solenoid 40 is pulled inwardly when the solenoid coil is energized, the collar 42 will move upwardly in the position indicated by the arrow A in Fig. 1. In so doing, the worm gear 48 meshes with the worm 45 on the outer end of the collar 42, as shown in the right hand view in Fig. 2. In a reverse manner, when the plunger 36 of the solenoid 35 is drawn into the solenoid coil when the same is energized, the collar 42 is caused to move downwardly in the direction of the arrow B in Fig. 1 and in so doing the worm gear 48 will engage with the worm 46. Consequently, the angle of the blades of the propeller will be decreased until the engine is unloaded to such an extent that the R. P. M. is brought back up to the desired speed, which is the R. P. M. toward which the dead spot 26 is pointing.

Consequently, if the engine speed drops to a value lower than the R. P. M. at which the governing device is set to regulate, contact is made between the contactor 26 and the contact strip 21, and in so doing the circuit through the relay 33 is closed, and the solenoid 35 will be energized to pull the plunger 36 into the solenoid coil and engage the propeller blade shifting mechanism and in so doing the angle of the propeller blade will be decreased until the engine is unloaded to such an extent that the R. P. M. is brought back up to the desired speed, which corresponds to the indicated R. P. M. toward which the dead spot 26 is pointed.

It is to be understood from the foregoing description that as long as the contactor 26 contacts with the dead spot 25 which is positioned at the junction of the contact strips 21 and 22, that the worm gear 48 will be in the neutral position with respect to the collar 42, as shown in the middle view of Fig. 2. During such time the blades of the propeller will be locked in place and further shifting of their angles will be prevented.

As long as the handle 66 is in the down position, automatic control for varying the pitch of the propeller blades will be effected by reason of the fact that the handle 66 in being moved to the "down" position will rotate the cam 64 to such an extent as to bring the flexible blades of the switches 62 and 63 respectively into contact with one another.

Should the pilot find it desirable to effect a change in the pitch of the propeller blades manually, this same may be accomplished by raising the handle 66 into the position illustrated in Fig. 6 of the drawings. When in the raised position, the cam 64 will be moved into a position corresponding to that illustrated in Fig. 7 of the drawings and the blades of the switches 62 and 63 will be sprung apart. Consequently, the circuit between the relays 33 and 39 and the contact strips 21 and 22 will be broken. Under these circumstances, the pilot is enabled to manually change the blade angle by merely depressing either of the momentary contact switches 67 or 68 to effect a corresponding increase or decrease in the pitch of the propeller blades.

Means are also provided to prevent the propeller blades from being shifted when the engine is at idling speed. To accomplish this purpose, in moving the throttle to the idling position, the link 72 will be moved in the direction of the arrow C as shown in Fig. 7. Should this be the case, the high point of the cam 69 will be rotated clockwise and in so doing the contact points of both the switches 62 and 63 will be separated and the circuit through the contact strips 21 and 22 and the relays 33 and 39 respectively will be broken.

Figs. 8 and 9 represent a propeller blade angle shifting mechanism which is operated by the use of a driven type electro-mechanical device such for example as an electric motor. Fig. 3 illustrates diagrammatically the control system necessary to effect a shifting of the propeller blade mechanism illustrated in Figs. 8 and 9. As shown in Fig. 3, the electric control system for actuating the motor 73 is similar to that used in connection with the installation shown in Fig. 1 with the exception that in this installation the relay 33 is connected in series with the primary winding of the motor 73. In a like fashion the relay 39 is connected in series with the secondary winding of the motor 73. The operation of this installation is as follows:

If the engine speeds up to an R. P. M. higher than the R. P. M. at which the governing device is set to regulate, contact is made between the contactor 26 and the contact strip 22; this closes a circuit through the relay 39. At the same time the relay 39 closes the circuit through the secondary field windings of the motor 73 and in so doing a direction of rotation will be given the motor to effect an increase in pitch of the propeller blade angles until the engine R. P. M. is brought down to the desired speed, which as before stated, is the speed toward which the dead spot 25 is pointed. On the other hand, should the engine speed drop to a value lower than the R. P. M. at which the governing device is set to regulate, contact will be established between the contactor 26 and the contact strip 21; this closes a circuit through the relay 33. The relay 33 in closing permits current to flow from the battery through the primary winding of the motor and as a result the direction of rotation of the motor will be reversed to effect a decrease in the blade angle of the propeller blades until the R. P. M. of the engine is brought up to the desired speed.

As heretofore stated, an example of an electrically operated propeller is illustrated in Figs. 8 and 9. As shown in Fig. 8, this mechanism is provided with a flexible shaft 74 which is driven by the motor 73 heretofore mentioned. The flexible shaft 74 is connected to a rotatable shaft provided in the propeller mechanism which is formed centrally with a worm gear 75 which meshes with a ring gear 76. This ring gear is threaded to fit the worm on a stationary flange 77 as shown in Fig. 9. Rotation of the gear 76 causes the gear to move itself forwardly or backwardly along the worm screw 77a provided on the stationary flange 77. As shown in Fig. 9, the ring gear 76 has an enlarged housing 78 formed on its one end which is adapted to receive a radial thrust bearing 78a, the inner race of which is mounted on a yoke 79. This yoke carries a plurality of slide links 80 which are slotted as indicated by the numeral 81 to engage the operating pins 82 which are secured to the propeller blades 83 as shown in Figs. 8 and 9. From the foregoing it will be apparent that the motor 73 causes movement of the gear 76 forwardly or backwardly and carries the yoke 79 and the link 80 with it, thereby varying the propeller blade angle.

As many changes could be made in the above construction and as many apparently widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention which, as a matter of language, might be said to fall therebetween.

I claim:

1. The combination with an internal combustion engine, of a propeller pitch changing mechanism, means for actuating said propeller pitch changing mechanism to positively increase or decrease the pitch of the propeller and selective engines controlled means cooperating with said last mentioned means for automatically increasing or decreasing the pitch of the propeller and balance the power output of said engine for any selected engine speed.

2. The combination with an internal combustion engine, of a propeller pitch changing mechanism, means for actuating said propeller pitch changing mechanism and selectively adjustable means cooperating with said last mentioned means for selectively actuating said propeller pitch changing mechanism and automatically balance the output of said engine for any selected engine speed.

3. The combination with an internal combustion engine, of a propeller pitch changing mechanism, means for actuating said propeller pitch changing mechanism and selectively adjustable engine driven means cooperating with said last mentioned means for automatically changing the pitch of the propeller in accordance with any predetermined setting of said selective means to balance the output of the engine.

4. The combination with an internal combustion engine, of a propeller pitch changing mechanism, means for actuating said propeller pitch changing mechanism and engine driven means cooperating with said first mentioned means and including a selector device operated accordingly as the speed of the engine increases or decreases for automatically changing the pitch of the propeller for any change in speed of said engine above or below the selected speed.

5. The combination with an internal combustion engine, of a propeller pitch changing mechanism, means for actuating said propeller pitch changing mechanism and engine driven means cooperating with said first mentioned means and including an engine speed selector device operating in a manner such that as the speed of the engine increases or decreases above or below the selected speed, the pitch of the propeller will be accordingly automatically changed and balance the output of said engine.

6. The combination with an internal combustion engine, of a propeller pitch changing mechanism, means for positively actuating said propeller pitch changing mechanism to positively increase or decrease the pitch of the propeller and electrically actuated engine driven means cooperating with said first mentioned means for predeterminately changing the pitch of the propeller automatically accordingly as the engine speed changes and thereby maintain said engine speed substantially constant, at any desired point in its speed range said last-mentioned means including auxiliary manually operated means for optionally effecting a further change in the pitch of the propeller above or below said first-mentioned change.

7. The combination with an internal combustion engine, of a propeller pitch changing mechanism, means for actuating said propeller pitch changing mechanism and selectively adjustable engine controlled means for controlling said first mentioned means and operating in a manner such as to automatically increase or decrease the pitch of the propeller in a positive manner at any selected speed in the speed range of said engine accordingly as the engine speed increases or decreases above or below the selected speed and thereby maintain said selected engine speed substantially constant.

8. The combination with an internal combustion engine, of a propeller pitch changing mechanism, solenoid means for actuating said propeller pitch changing mechanism, and means including a controlling device electrically connected to said solenoid means and responsive to changes in speed of said engine for automatically effecting a change in the pitch of the propeller accordingly as the engine speed increases or decreases.

9. The combination with an internal combustion engine, of a propeller pitch changing mechanism, solenoid means for actuating said propeller pitch changing mechanism, and engine driven means including a controlling device electrically connected to said solenoid means and responsive to changes in the speed of said engine to automatically effect a change in the pitch of the blade of the propeller accordingly as the engine speed increases or decreases.

10. Means by which the blades of a propeller may be varied as to pitch automatically with changes in engine speed, comprising, an engine speed indicating element, a propeller pitch changing mechanism, and an electrically controlled means for actuating said pitch changing mechanism, said last mentioned means including a device operated accordingly as said engine speed indicating element responds to changes in engine speed.

11. Means by which the blades of a propeller may be varied as to pitch automatically with changes in engine speed, comprising, an engine speed indicating element, including an index arm responsive to changes in engine speed, a contactor carried by said arm, a pair of independently carried contact strips with one of which said contactor is alternatively adapted to contact, and electrically controlled means connected to said contact strips and contactor and operating in a manner such that when one of said contact strips makes contact, the pitch of the blades is caused to be increased and when the other of said contact strips makes contact, the pitch of the blades is caused to be decreased accordingly as said index arm responds to changes in engine speed.

12. Means by which the blades of a propeller may be varied as to pitch automatically with changes in engine speed comprising, an engine speed indicating element including a scale, an index arm responsive to changes in engine speed movable over said scale, a contactor carried by said arm, a pair of segmental contact strips insulated from each other, with one of which contact strips said contactor is alternatively adapted to make contact, means for adjusting said contact point relative to said scale whereby the junction of said points may be positioned so as to underly any position of said index arm in the range of its movement over said scale and electrically controlled means connected to said contact strips and contactor and operating in a manner such that when one of said contact strips makes contact, the pitch of the blades is caused to be increased and when the other of said contact strips makes contact the pitch of the blades is caused to be decreased, accordingly as said index arm responds to changes in engine speed.

13. The combination with an internal combustion engine having a propeller mounted thereon, of a propeller pitch changing mechanism, an indicating instrument including a scale, an index arm movable over said scale and positioned by the speed of said engine, a contactor carried by said index arm, a pair of segmental contact strips insulated from each other with one of which said contactor is alternatively adapted to make contact, manually controlled means for adjusting said contact strips relative to said scale whereby the junction of said strips may be positioned coincident with the position of said contactor for any position of said index arm in the range of its movement over said scale, and electrically controlled means connected to said contact strips and contactor and operated in a manner such that when said contactor moves from said junction into engagement with one of said contact strips said propeller pitch changing mechanism will be operated to increase the pitch of the blades of said propeller and when said contactor moves from said junction into engagement with the other of said contact strips said propeller pitch changing mechanism will be operated to decrease the pitch of the blades of said propeller, accordingly as said index arm responds to changes in engine speed.

14. The combination with an internal combustion engine having a propeller mounted thereon, of a mechanically operated pitch changing mechanism, an indicating instrument including a scale, an index arm movable over said scale and positioned by the speed of said engine, a contactor carried by said index arm, a pair of segmental contact strips insulated from each other with one of which said contactor is alternatively adapted to make contact, manually controlled means for adjusting said contact strips relative to said scale whereby the junction of said strips may be positioned coincident with the position of said contactor for any position of said index arm in the range of its movement over said scale, and an electric controlling system for operating said propeller pitch changing mechanism and including a source of electrical energy, electrical connections between said source and said contact strips and contactor and a pair of solenoids electrically connected to said source and mechanically connected to said propeller pitch changing mechanism and operating in a manner such that when said contactor moves from said junction into engagement with one of said contact strips, one of said solenoids is energized to mechanically actuate said propeller pitch changing mechanism and increase the pitch of the blades of said propeller and when said contactor moves into engagement with the other of said contact strips the other of said solenoids is energized to mechanically actuate said propeller pitch changing mechanism and decrease the pitch of the blades of said propeller, accordingly as said index arm responds to changes in engine speed.

15. The combination with an internal combustion engine having a propeller mounted thereon, of a manually operated pitch changing mechanism, an indicating instrument including a scale, an index arm movable over said scale and positioned thereon by the speed of said engine, a contactor carried by said index arm, a pair of segmental contact strips insulated from each other, with one of which said contactor is alternatively adapted to make contact, manually controlled means for adjusting said contact strips relative to said scale whereby the junction of said strips may be positioned coincident with the position of said contactor for any position of said index arm in the range of its movement over said scale, and an electric controlling system for operating said propeller pitch changing mechanism and including a source of electrical energy, electrical connections between said source and said contact strips and contactor, a pair of solenoids, each being electrically connected to said source, an electrical relay connected in series with each of said solenoids, the plungers of each solenoid being pivotally connected to said propeller pitch changing mechanism, the whole arranged to operate in a manner such that when said contactor moves from said junction into engagement with one of said contact strips one of said solenoids is energized through said relay to increase the pitch of the blades of said propeller and when said contactor moves from said junction into engagement with the other of said contact strips, the other solenoid is energized through its relay to decrease the pitch of the blades of said propeller, accordingly as said index arm responds to changes in engine speed.

16. The combination with an internal combustion engine having a propeller mounted thereon, of a mechanically operated pitch changing mechanism, an indicating instrument including a scale, an index arm movable over said scale and positioned by the speed of said engine, a contactor carried by said index arm, a pair of segmental contact strips insulated from each other with one of which said contactor is alternatively adapted to make contact, manually controlled means for adjusting said contact strips relative to said scale whereby the junction of said strips may be positioned coincident with the position of said contactor for any position of said index arm in the range of its movement over said scale, and an electric controlling system for operating said propeller pitch changing mechanism and including a source of electrical energy, electric connections between said source and said contact strips and contactor, a pair of solenoids, each being electrically connected to said source, an electric relay connected in series with each of said solenoids, the plunger of each solenoid being pivotally connected in opposing relation to said propeller pitch changing mechanism.

17. The combination with an internal combustion engine having a propeller mounted thereon, of an electrically operated pitch changing mechanism including a reversible motor, an indicating instrument including a scale, an index arm movable over said scale and positioned thereon by the speed of said engine, a contactor carried by said index arm, a pair of segmental contact strips insulated from each other, with one of which said contactor is alternatively adapted to make contact, manually controlled means for adjusting said contact strips relative to said scale whereby the junction of said strips may be positioned coincident with the position of said contactor for any position of said index arm in the range of its movement over said scale, and an electric controlling system for operating said propeller pitch changing mechanism and including a source of electric energy, electrical connections between said source and said contact strips and contactor, a pair of electrical relays, one of said relays being connected in series with the primary winding of said reversible motor, the other of said relays being connected in series with the secondary winding of said reversible motor and operating in a manner such that when said contactor moves from said junction into engagement with one of said contact strips as a result of a change in speed in said engine, one of said relays will be energized to cause current to flow from said source of electric energy through the one winding of the motor and effect a rotation of the armature thereof to increase the pitch of the blades of said propeller and when said contactor moves from said junction into engagement with the other of said contact strips, the other of said relays will be energized to cause a current to flow through the other winding of said motor and effect a rotation of the armature in a reverse direction and decrease the pitch of the blades of the propeller, accordingly as said index arm responds to changes in engine speed.

18. The combination in an internal combustion engine having a propeller mounted thereon, of a propeller pitch changing mechanism, an indicating instrument including a casing, a scale thereon, an index arm movable over said scale and positioned thereon by the speed of said engine, a contactor carried by said index arm, a rotatable supporting plate carried by said casing, a pair of ring-shaped segmental contact strips mounted thereon and insulated from each other and from said plate, manually controlled means for adjusting said contact strips relative to said scale whereby the insulated junction of said strips may be positioned coincident with the position of said contactor for any position of said index arm in its range of movement over said scale, and electrically controlled means connected to said contact strips and contactor and operated in a manner such that when said contactor moves from said junction into engagement with one of said contact strips, said propeller pitch changing mechanism will be operated to increase the pitch of the blades of said propeller and when said contactor moves from said junction into engagement with the other of said contact strips said propeller pitch changing mechanism will be operated to decrease the pitch of the blades of said propeller, accordingly as said index arm responds to changes in engine speed.

19. The combination as set forth in claim 14, said electric control system being characterized by including a switching device so constructed and arranged such as to selectively effect a change in the pitch of said propeller automatically or permit of such change electrically by manually operated means.

20. The combination as set forth in claim 15, said electric control system being characterized by including a switching device comprising a casing, a pair of cam actuated spring switches one for each of said contact strips, a pair of momentary contact switches in series connection with said relays and manually controlled means for moving said cam to close said spring switches and for simultaneously rendering said last mentioned switches inaccessible for manual operation.

21. The combination as set forth in claim 15, said electric control system being characterized by including a switching device comprising a casing a pair of cam actuated spring switches one for each of said contact strips, a pair of momentary control switches in series connection with said relays and manually controlled means for moving said cam to close said spring switches and for simultaneously rendering said last mentioned switches inaccessible for manual operation, said means being arranged in such a manner that when said momentary control switches are accessible for manual operation, the cam actuating said spring switches is moved into a position such as to open said spring switches and render automatic operation by said contactor ineffective.

22. The combination as set forth in claim 15, said electric control system being characterized by including a switching device comprising a casing, a pair of cam actuated spring switches, one for each of said contact strips, a pair of momentary control switches in series connection with said relays, manually controlled means for moving said cam to close said spring switches and for simultaneously rendering said last mentioned switches inaccessible for manual operation and means controllable by the throttle of said engine for opening said spring contacts when the throttle is moved into idling position.

23. The combination as set forth in claim 15, said electric control system being characterized by including a switching device comprising a casing, a pair of cam actuated spring switches, one for each of said contact points, a pair of momentary contact switches in series connection with said relays, manually controlled means for moving said cam to close said spring switches and for simultaneously rendering said last mentioned switches inaccessible for manual operation and means controllable by the throttle of said engine for opening said spring switches when the throttle is moved into idling position, said means comprising a rotatable cam engaging each of said spring switches and a lever connected to said cam, the free end of said lever being adapted for connection with the throttle of said engine.

24. A pitch control system, comprising in combination, an electro-mechanical circuit having reversible electric means, propeller pitch changing means operatively connected to said reversible electric means, and means responsive to changes in engine speed for alternately effecting a reversal of the current in said reversible means with changes in speed of said engine.

25. A pitch control system, comprising in combination, propeller pitch changing means, an electric circuit including electro-mechanical means for actuating said propeller pitch changing means in one direction, a second electric circuit including electro-mechanical means for adjusting said pitch changing means in the opposite direction, and means responsive to changes in engine speed and common to both circuits for alternately closing and opening said circuits with changes in speed.

26. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, and engine controlled means common to both circuits for alternately opening or closing said circuits when the engine speed increases or decreases from a selected speed.

27. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, and adjustable engine controlled means common to both circuits for alternately opening or closing said circuits when the engine speed increases or decreases from a selected speed.

28. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, and adjustable engine controlled means common to both circuits for alternately opening or closing said circuits automatically when the engine speed increases or decreases from selected speed.

29. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and throttle controlled means for rendering said last-mentioned means ineffective when the throttle is moved into idling position.

30. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and throttle controlled means common to both circuits for rendering said last-mentioned means ineffective when the throttle is moved into idling position.

31. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and throttle controlled switch means connected in series with each of said circuits respectively for rendering said last-mentioned means ineffective when the throttle is moved into idling position.

32. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and throttle controlled switch means connected in series with each of said circuits respectively for simultaneously rendering said last-mentioned means ineffective when the throttle is moved into idling position.

33. A pitch control system, comprising in combination, means for changing the pitch of a propeller, an electric circuit including electro-mechanical means for actuating said propeller pitch changing means in one direction, a second electric circuit including eletcro-mechanical means for actuating said pitch changing means in the opposite direction, engine controlled means common to both circuits for alternately opening or closing said circuits when the engine speed increases or decreases from a selected speed, and separate electric means for predeterminately closing either of said circuits to obtain a further actuation of said pitch changing means.

34. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and separate electric means for selectively closing either of said circuits to obtain a further actuation of said pitch changing means.

35. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and separate manually operable electric means for selectively closing either of said circuits to obtain a further actuation of said pitch changing means.

36. A pitch control system, comprising in combination, means for changing the pitch of a propeller, an electric circuit including electro-mechanical means for actuating said propeller pitch changing means in one direction, a second electric circuit including electro-mechanical means for actuating said pitch changing means in the opposite direction, engine controlled means common to both circuits for alternately opening or closing said circuits when the engine speed increases or decreases from a selected speed, and separate manually operated switches disposed in series relation in each of said circuits respectively for predeterminately closing either of said circuits to obtain a further actuation of said pitch changing means when desired.

37. In combination with an electrical pitch control system having a propeller pitch changing mechanism, a source of electrical energy, a pair of circuits connected thereto having reversible electro-mechanical means operatively connected to said propeller pitch changing mechanism, of engine controlled means common to both circuits for alternately effecting a reversal of the current in said circuits with changes in engine speed and actuate said pitch changing mechanism accordingly.

38. In combination with an electrical pitch control system having a propeller pitch changing mechanism, a source of electrical energy, a pair of circuits connected thereto having reversible electro-mechanical means operatively connected to said propeller pitch changing mechanism, of adjustable engine controlled means common to both circuits for alternately opening or closing said circuits automatically when the engine speed increases or decreases from a selected speed.

39. In combination with an electrical pitch control system having a propeller pitch changing mechanism, a source of electrical energy, a pair of circuits connected thereto having reversible electro-mechanical means operatively connected to said propeller pitch changing mechanism, of adjustable engine controlled means common to both circuits for alternately opening or closing said circuits automatically when the engine speed increases or decreases from a selected speed, and throttle controlled means for rendering said last-mentioned means ineffective when the throttle is moved to idling position.

40. In combination with an electrical pitch control system having a propeller pitch changing mechanism, a source of electrical energy, a pair of circuits connected thereto having reversible electro-mechanical means operatively connected to said propeller pitch changing mechanism, of adjustable engine controlled means common to both circuits for alternately opening or closing said circuits automatically when the engine speed increases or decreases from a selected speed, and throttle controlled means common to both circuits for simultaneously rendering said last-mentioned means ineffective when the throttle is moved to idling position.

41. In combination with an electrical pitch control system having a propeller pitch changing mechanism, a source of electrical energy, a pair of circuits connected thereto having reversible electro-mechanical means operatively connected to said propeller pitch changing mechanism, of adjustable engine controlled means common to both circuits for alternately opening or closing said circuits automatically when the engine speed increases or decreases from a selected speed, and separate electrical means for predeterminately closing either of said circuits to obtain a further actuation of said pitch changing means.

42. In combination with an electrical pitch control system having a propeller pitch changing mechanism, a source of electrical energy, a pair of circuits connected thereto having reversible electro-mechanical means operatively connected to said propeller pitch changing mechanism, of adjustable engine controlled means common to both circuits for alternately opening or closing said circuits automatically when the engine speed increases or decreases from a selected speed, and separate manually operable electric means for predeterminately closing either of said circuits to obtain a further actuation of said pitch changing means when desired.

HOWARD H. COUCH.